United States Patent [19]

Hilbish et al.

[11] Patent Number: 5,009,550

[45] Date of Patent: Apr. 23, 1991

[54] ARTICLE HANDLING DEVICE WITH LOW PROFILE SIDE GUIDES

[75] Inventors: Brian K. Hilbish, Beford; David W. Leonard, Sr., Lynchburg; Arnold C. Burgess, Madison Heights; David R. Burns, Forest, all of Va.

[73] Assignee: Simplimatic Engineering Company, Lynchburg, Va.

[21] Appl. No.: 400,523

[22] Filed: Aug. 30, 1989

[51] Int. Cl.⁵ .................... B65G 47/256; B65G 51/03
[52] U.S. Cl. ........................................ 406/87; 406/86; 406/88; 406/181; 209/656
[58] Field of Search ........................ 406/86-89, 406/181; 198/442, 438, 453, 398; 209/656, 940, 539

[56] References Cited

U.S. PATENT DOCUMENTS

| | | | |
|---|---|---|---|
| Re. 32,684 | 5/1988 | Lenhart | 406/88 X |
| 2,369,557 | 2/1945 | Gettelman | 209/656 X |
| 3,176,821 | 4/1965 | Eldred et al. | 198/453 X |
| 3,610,399 | 10/1971 | Friedrich | 198/398 |
| 3,643,782 | 2/1972 | Risley | 198/398 X |
| 3,685,632 | 8/1972 | Brady | 406/88 |
| 3,730,325 | 5/1973 | Goodwin | 198/398 X |
| 3,999,806 | 12/1976 | Hurd | 406/88 X |
| 4,347,022 | 8/1982 | Lenhart | 406/88 |
| 4,456,406 | 6/1984 | Lenhart | 406/88 |
| 4,462,720 | 7/1984 | Lenhart . | |
| 4,500,229 | 2/1985 | Cole et al. | 406/88 |
| 4,560,060 | 12/1985 | Lenhart | 198/453 X |
| 4,568,223 | 2/1986 | Lenhart | 406/88 |
| 4,655,677 | 4/1987 | Lenhart . | |
| 4,669,604 | 6/1987 | Lenhart | 198/453 |
| 4,721,419 | 1/1988 | Lenhart | 406/88 |
| 4,723,513 | 3/1988 | Lenhart | 406/88 |
| 4,730,955 | 3/1988 | Lenhart | 406/86 X |
| 4,730,956 | 3/1988 | Lenhart | 406/86 X |
| 4,784,254 | 11/1988 | Schraft . | |

FOREIGN PATENT DOCUMENTS

| | | | |
|---|---|---|---|
| 2581374 | 11/1986 | France | 198/398 |
| 2061856 | 5/1981 | United Kingdom | 406/88 |
| 2073122 | 10/1981 | United Kingdom | 406/87 |

Primary Examiner—Margaret A. Focarino
Assistant Examiner—James M. Kannofsky
Attorney, Agent, or Firm—St. Onge Steward Johnston & Reens

[57] ABSTRACT

An air conveyor system is provided for transporting a stream of articles en masse along a channel from a generally upstream position in a generally downstream direction towards a generally downstream position. A conveyor surface has opposing edges with the channel therebetween and a plurality of air propulsion slots extending through the surface, these slots being directionally oriented to propel articles pneumatically on the surface in the downstream direction. A plenum is provided for connecting to a source of air under pressure and in communication with the slots. At least one guide member defines at least one boundary for the channel, by being mounted adjacent at least one of the opposing edges of the surface in alignment with the downstream direction to generally direct flow of articles in the downstream direction by impeding article movement across the member. The member has a guide member height above the surface that is substantially less than a height of the articles above the surface, the member height being chosen to cause the articles to either flow in the downstream direction or be propelled over the guide member to a region outside of the channel.

26 Claims, 3 Drawing Sheets

# ARTICLE HANDLING DEVICE WITH LOW PROFILE SIDE GUIDES

FIELD OF THE INVENTION

The present invention relates to an article handling device such as an air conveyor that includes a can combiner. More particularly, an air conveyor is disclosed using side guide members dimensioned to have a low profile for not only channeling article flows, but also permitting damaged or other anomalous articles to be readily propelled over the side guides for expulsion from the conveyor, thereby with an attendant reduced risk of jamming.

BACKGROUND OF THE INVENTION

Air conveyor systems for transporting articles are well known in the art. Such systems are also well known to include combiners capable of directing a flow of articles en masse into a plurality of branch lanes. It is also known to gradually narrow article flow to funnel articles into a single file format. See, e.g. U.S. Pat. Nos. 3,999,806; 4,347,022; 4,721,419; 4,730,955; and 4,730,956.

Such prior art air conveyor systems typically use conventional guide rails or sidewalls to confine article flow to a desired conveyor pathway. It is also known to form different flow channels or configurations by diverting article flow around vertical barriers. Such guide rails or barrier walls usually have a vertical height that is above the midpoint of the height of articles being conveyed to present a high barrier profile to thereby substantially insure that no errant article will leave the conveyor in an uncontrolled manner.

However, anomalous articles such as damaged or bent articles or articles that get tipped over on their sides may jam in or against guide rails and barriers, thereby disrupting operation and perhaps necessitating shutdown for clearing.

SUMMARY OF THE PRESENT INVENTION

An air conveyor system is provided for transporting upstanding articles such as for example beverage cans. The system includes low profile side guide members that are, in the preferred embodiment, elongated strip members of rectangular cross section affixed directly to the deckplate and having an inwardly facing sidewall portion shaped and dimensioned to define borders or boundaries of article flow. However, instead of having a sidewall vertical height substantially corresponding to article height, the strip height is substantially less than article height, such as for example preferably in the range of only 8 to 20 percent of the can height or about only ½ to ⅞ inches for a can height of 41/16 inches. It has been found that such a reduced height still adequately directs article flow, while at the same time presenting a sufficiently low profile to overturned, damaged, or other anomalous articles to permit such articles to simply be propelled over the guide strips by normal line pressure to thereby be expelled completely out of the system to avoid jamming.

In a particularly preferred embodiment, a can combiner is provided as part of an air conveyor system wherein one pair of such low profile guide strips are mounted on the deckplate to form the outer boundaries of article flow along a conveyor path, while another pair of such guide strips are mounted on the deckplate inwardly of said one pair to intersect in a V-shape having a vertex pointing into the direction of oncoming article flow. Most oncoming articles are then generally diverted to one side or the other of the V, while anomalous articles such as for example distorted, crumpled, or overturned articles are permitted to simply tumble, roll, or otherwise cross over the low threshold strips to a region outside the conveyor path.

It is an object of the present invention to provide an air conveyor system wherein speed of operation can be improved.

It is a further object of the present invention to provide an air conveyor system having improved performance with respect to jamming tendencies.

It is a further object of the present invention to provide a can combiner capable of adequate speed of operation with reduced tendency to jam.

Further objects and advantages of the present invention will become apparent from the following description of the drawings and the preferred embodiments.

DETAILED DESCRIPTION OF THE PREFERRED EMBODIMENT

Figure 1:
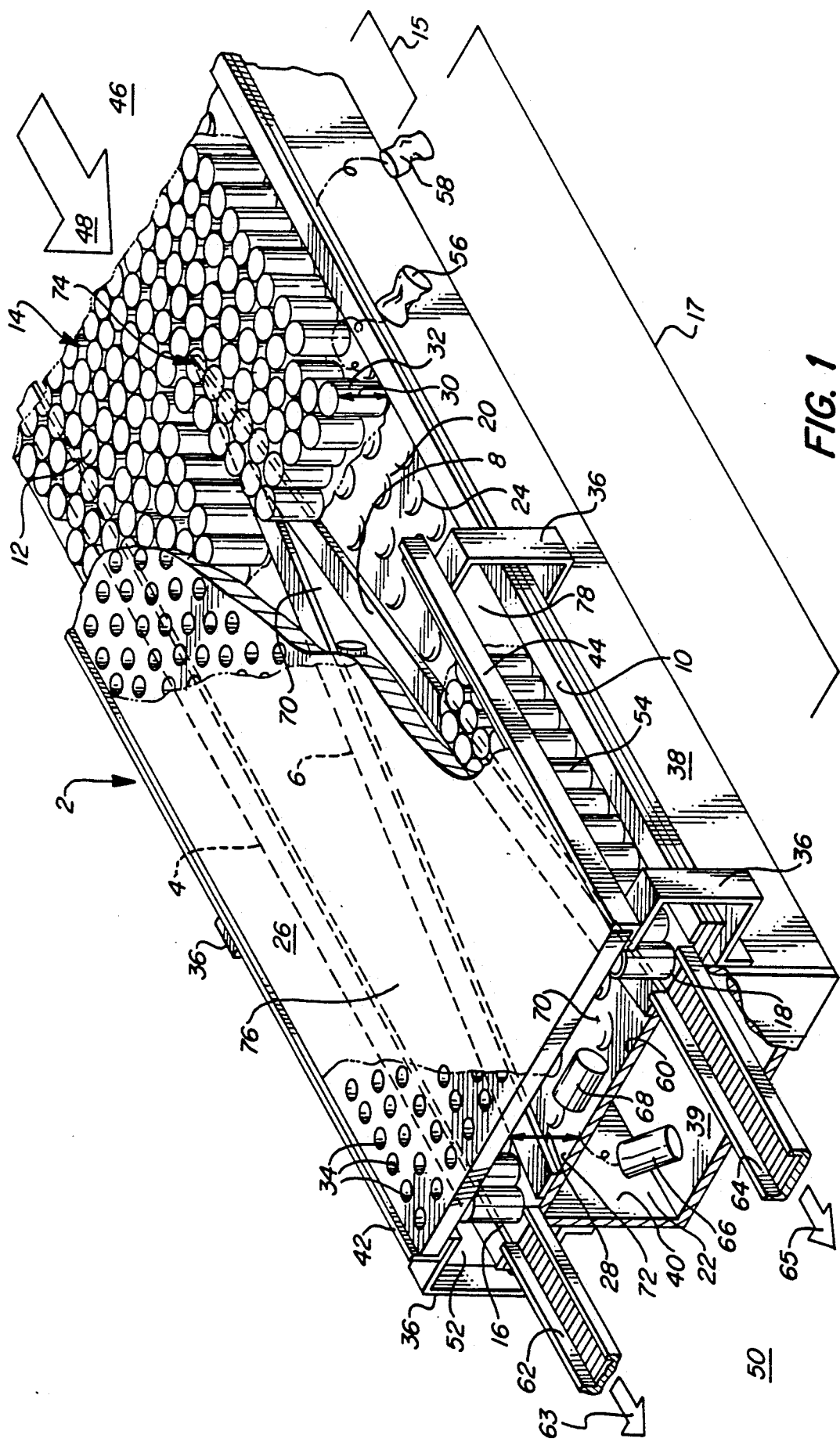
FIG. 1 is an isometric view with partial cutaways of the air conveyor including the combiner of the present invention.

The air conveyor and combiner 2 of the present invention in FIG. 1 with the low profile side guide members such as strips 4, 6, 8, and 10 receives articles such as for example upstanding cans 12 en masse at 14 from a conventional source (not shown) that provides no part of the present invention, conveys the cans 12 along an air conveyor section 15 of any desired length, and in the combiner section 17 thereof divides said cans 12 into two single file lanes 16 and 18 for supplying cans 12 in an orderly, laned fashion to conventional processing machinery (not here shown) along conventional conveyor surfaces 62 and 64 in the direction of arrows 63 and 65 that provides no part of the present invention, such as for example testing, labelling, filling, or other work stations. As further discussed below, the guide strip height is only about 13 per cent of the height of cans 12 to confine most of the cans to the conveyor and combiner, while permitting anomalous cans that might otherwise jam to tumble freely out.

Cans 12 are pneumatically transported along a deckplate 20 under a line pressure generated at least in part by the lifting and propelling action of pressurized air supplied from a conventional source (not here shown) that is operatively coupled to plenum 22 in pneumatic communication with a plurality of conventional directional air jets such as semicircular slots 24 formed through deckplate 20 into pneumatic communication with the plenum 22. A removable holddown such as cover 26 is mounted parallel to and above deckplate 20 at a vertical distance 28 therefrom that is slightly greater than the average height 30 of cans such as for example can 32 to thereby impede cans 12 from tipping over on their sides. Cover 26 preferably has perforations 34 formed therein, although cover 26 may be solid as well, and is mounted above deckplate 20 by generally V-shaped brackets such as at 36 secured to opposing plenum sidewalls 38 and 40 joined by plenum bottom wall 39, brackets 36 being so joined by conventional means such as bolts 37 to support opposing L-shaped elongated members 42 and 44 for receiving cover 26 therebetween in a removable fashion.

The basic manner in which air conveyors operate to transport cans 12 from a generally upstream position at 46 in a generally downstream direction indicated by arrow 48 towards a generally downstream position 50 is well known in the art and need not be elaborated upon here.

The side regions 52 and 54 of conveyor 2 are generally open so that cans such as for example at 56 and 58 that are propelled over a side guide such as 10 readily fall out of the conveyor 2 to avoid jamming. Also, at the point 60 where conveyor 2 is terminated and conventional single file conveyors 62 and 64 or other conventional article processing apparatus not shown receive articles from lanes 16 and 18, articles such as 66 and 68 that are propelled over side guides 6 and 8 into center region 70 of conveyor 2 are able to fall out at open area 72 to also avoid jamming.

Side guide pair 6, 8 are joined in a V-shape inwardly of outermost side guide pair 4, 10 with the vertex 74 thereof pointed in an upstream direction and guides 6 and 8 diverging in a downstream direction to form center region 70 on the open side of said V as well as separate left and right channels 76 and 78 which become increasingly narrowed in a downstream direction. It can be readily appreciated that, as cans 12 approach vertex 74 en masse under line pressure the cans 12 separate into left and right channels 76 and 78, a process which is called combining.

It is understood that using the concept of the present invention other arrangements can also be employed. For example, more than two channels could be formed using more than one V-shaped divider. In a simple form, only one channel could be formed by placing side guides such as 4 and 10 in spaced apart relationship, which could be parallel or with a successively more narrow configuration to funnel a group of articles into a narrower format such as single file.

Figure 2:
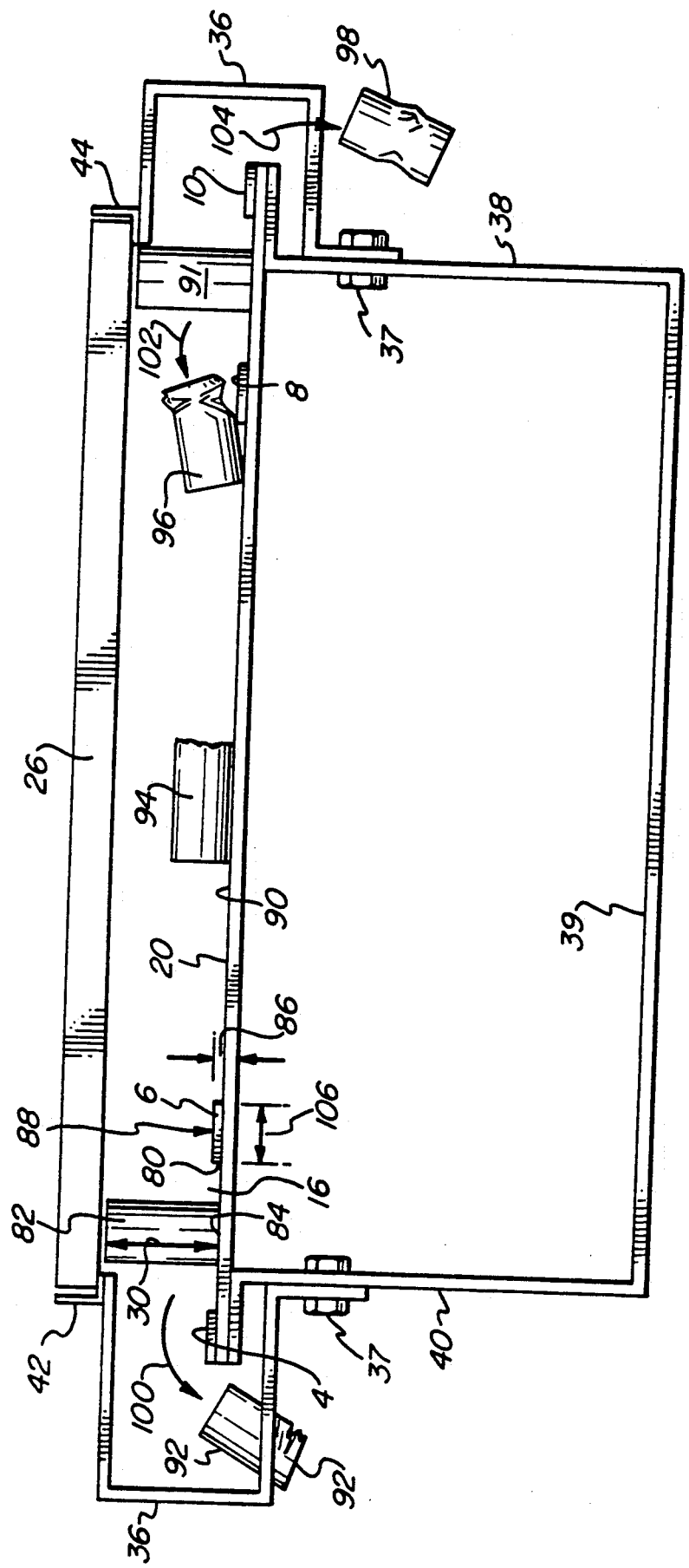
FIG. 2 is an end cross-sectional view of the device of FIG. 1.

FIG. 2 shows conveyor 2 of FIG. 1 in cross section with like figure numbers referring to like structure in FIG. 1. Side guide strips 4, 6, 8, and 10 are formed of a suitably rigid material such as for example a metal like aluminum, a polymeric material like polyethylene, or a combination of the two such as for example an aluminum strip with a Hi Fax wear covering thereon. The strips such as strips 6 are preferably affixed directly onto the conveyor deckplate 20 by conventional fastening means such as for example rivets, nut and bolt combinations, or welding. However, such a guide strip need not be flush with deckplate 20, but could be mounted in a spaced fashion therefrom with suitable fastening and bracket means, so long as the strip provides sideways guidance for articles 12 but with a sufficiently low vertical height to permit anomalous cans to readily tumble out of the conveyor path. In addition to the other advantages described herein, such a simple means of installing side guides is less tedious, time consuming, and expensive than the prior art method using a variety of side rails, brackets, clamps, and fasteners.

Looking more closely at strip 6 by way of example only, strip 6 in the preferred embodiment has a generally rectangular cross-section with a sidewall such as shoulder portion 80 that faces inwardly towards the channel 16 to engage articles such as for example can 82 near the bottom end portion 84 thereof. For the typical container such as a beverage can, bottom end portion 84 is where the can is strongest; therefore, the likelihood of denting or otherwise damaging the can 82 is substantially reduced as compared to a prior art side rail system that would engage the can 82 nearer to the weaker can midriff region.

For beverage cans having a height 30 substantially in the range of about $3\frac{1}{2}$ to 7 inches along the longitudinal axis of the can, the distance 86 from the top surface 88 of strip 6 to top surface 90 of deckplate 20 is in the range of substantially about $\frac{1}{2}$ to 1 inch, preferably $\frac{5}{8}$. It has been found that for a can of height 4 13/16 inches, a strip height or thickness of $\frac{5}{8}$ inches will provide a sidewall 80 of sufficient height to adequately confine normal, routinely oriented cans such as 82 or 91 while permitting dislocated, damaged, disoriented, or otherwise anomalous cans such as for example at 92, 94, 96, or 98 to simply topple over the side guide under influence of line pressure and out of the system as indicated by arrows 100, 102, and 104. It has also been found that suitable operation is obtained so long as guide strip height is substantially in the range of about 8 to 20 percent of article height, preferably substantially about 13 percent. Strip 6 also has a width 106 substantially in the range of about $\frac{3}{4}$ to 2 inches, but should be narrow enough to permit cans to readily roll thereover. Strips 4, 6, 8, and 10 are understood to be identical in the preferred embodiment.

Strips such as 6 need not be rectangular, but could be any appropriate elongated member such as a rib, shoulder, sidewall, or other structure having a height of the above referenced percentage range and located to provide lateral guidance to articles moving along the conveyor.

Figure 3:
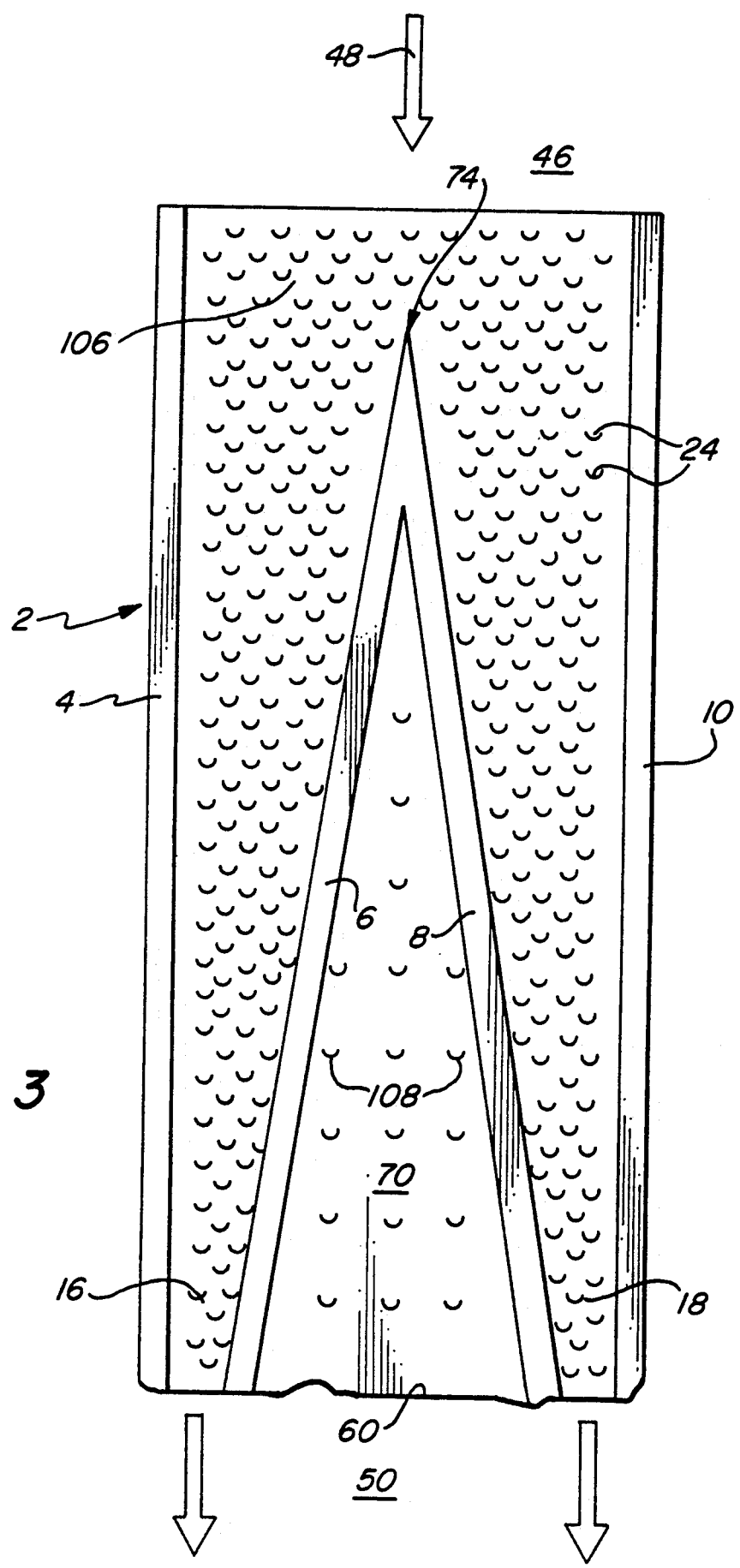
FIG. 3 is a top view of the device of FIG. 1.

In the top view of the deckplate 20 and strips 4, 6, 8, 10 of FIG. 3 with cover 26 and cans 12 thoroughly removed, like figure numbers also refer to like structures in the previous figures. The V-shape of inner guide strips 6 and 8 is readily apparent as guide strip pair 6, 8 forms left and right channels 16 and 18 in combination with guide strips 4 and 10. Another feature is shown in that the density of air jets 24 for the conveyor pathway 106 as well as channels 16 and 18 is shown to be substantially greater than for center deckplate region 70 by a factor of approximately 2. Jets 108 in the region 70 are for urging cans that are propelled across strips 6 or 8 into region 70 off end 60 of conveyor 2, but more slowly and gently than cans are transported in the conveyor pathways or channels.

The operation of conveyor 2 can be simply explained in that normal, upstanding cans moving along the conveyor under line pressure will normally be properly directed along the desired paths or channels by guides 4, 6, 8, and 10. The tendency of such cans to remain upstanding while moving in such a controlled fashion is enhanced by the presence of the cover 26, which is so spaced with respect to said deckplate just slightly higher than average can height to provide a retentive force against any cans trying to tip over during normal motion or jostling on the conveyor. However, certain cans may either be or become distorted, squeezed, damaged, or otherwise anomalous and therefore for a variety of reasons under actual operational conditions tip over on their sides. If such an anomalous can were caught or pinched in a channel of decreasing size such as at 16, or if such an anomalous can were somehow caught in a prior art guide rail assembly, an undesirable jamming condition could occur. In the present invention however, such an errant can simply rolls across the low threshold side guide and out of the way.

It is understood that terms like "up", "down", "left", "right", "inner", and "outer" are terms indicated to show relative motion only and are not intended to be limiting of the present invention in any way.

It should be further understood that various changes and modifications to the preferred embodiments described above will be apparent to those skilled in the art. Such changes and modifications can be made without departing from the spirit and scope of the present invention, and it is therefore intended that such changes and modifications be covered by the following claims.

What is claimed is:

1. An air conveyor system for transporting a stream of articles en masse along a channel from a generally upstream position in a generally downstream direction towards a generally downstream position, said system comprising:
   (a) a conveyor surface having opposing edges with said channel therebetween and a plurality of air propulsion slots extending through said surface, said slots being directionally oriented to propel articles pneumatically on said surface in said downstream direction;
   (b) a plenum for connecting to a source of air under pressure and in communication with said slots;
   (c) at least one first guide member for defining at least one boundary for said channel, by being mounted adjacent at least one of said opposing edges of said surface in alignment with said downstream direction to generally direct flow of said articles in said downstream direction; and
   (d) at least one second guide member for defining at least another boundary for said channel, by being mounted adjacent at least one of said opposing edges of said surface in alignment with said downstream direction, said second guide member having a guide member height above said surface that is substantially less than a height of said articles above said surface, said guide member height being chosen to cause said articles to either flow in said downstream direction or be propelled over said second guide member, and said second guide member mounted in a successively more narrow configuration with said first guide member such that normal line pressure created by said air propulsion slots propel overturned or distorted ones of said articles over said second guide member to a region outside of said channel.

2. The air conveyor system of claim 1, wherein said second guide member is mounted directly to said conveyor surface.

3. The air conveyor system of claim 1, wherein said second guide member is mounted with air propulsion slots on both an upstream and a downstream side thereof such that articles propelled over said second guide member are further propelled off said conveyor surface by air propulsion slots downstream of said second guide member.

4. The air conveyor system of claim 1, wherein said second guide member comprises an elongated strip member.

5. The air conveyor system of claim 4, wherein said elongated strip member has a generally rectangular cross section.

6. The air conveyor system of claim 5, wherein said second guide member has a thickness in a vertical direction substantially in the range of about ½ to 1 inch.

7. The air conveyor system of claim 6, wherein said second guide member has a width in a lateral direction substantially in the range of about ¾ to 2 inches.

8. The air conveyor system of claim 1, wherein said first guide member has said guide member height.

9. The air conveyor system of claim 1, wherein said guide member height is in the range of substantially about 8 to 20 percent of the article height being conveyed.

10. The air conveyor system of claim 9, wherein said guide height is substantially about 13 percent of said article height.

11. The air conveyor system of claim 1 further including a cover mounted generally parallel to and above said surface at a distance slightly greater than said article height, said cover for restraining said articles against tipping over as said articles are conveyed along said surface.

12. The air conveyor system of claim 1 including two first guide members and two second guide members, and wherein said second guide members diverge from each other and toward said first guide members along said downstream direction to form right and left channels.

13. An improved article handling device for separating a stream of randomly oriented articles flowing along an air conveyor pathway into at least a pair of separate air conveyor paths, said device comprising:
   (a) an air conveyor deckplate;
   (b) a first pair of spaced apart, longitudinally extending lateral side guides for establishing said pathway along said deckplate, said side guides having a top being located in a vertical direction above said deckplate a sufficient vertical distance relative to a vertical dimension of said articles to generally retain said articles between said side guides while at the same time permitting certain articles to be expelled to be urged laterally over said side guides and out of said pathway; and
   (b) a second pair of side guides positioned inwardly of said first pair and disposed in said conveyor pathway to form a partition between said separate air conveyor paths between facing ones of said first and second side guide pairs, said side guides diverging toward the direction of article flow to separate oncoming articles into either one or the other of said paths, said second pair also having a top located at said vertical distance to generally deflect said articles to either side of and around said second side guide pair while permitting other certain articles to be expelled to be urged across the top of said second pair of guides into a receiving area for expelled articles.

14. The device of claim 13, wherein each said side guide includes an elongated rib for mounting adjacent said conveyor surface to extend generally longitudinally of said conveyor pathways to the sides thereof.

15. The device of claim 14, wherein said rib has a shoulder portion for facing generally towards said pathway, said shoulder portion having a shape and being dimensioned to abut said articles at a region on said articles substantially vertically below a center of gravity of said articles.

16. The device of claim 15, wherein said shoulder is generally perpendicular to said deckplate.

17. The device of claim 16, wherein said second side guide pair are joined at an angle having a vertex aligned generally to point into said pathway.

18. The device of claim 13, wherein said side guide height is in the range of substantially about 8 to 20 percent of the article height.

19. The device of claim 18, wherein said side guide height is substantially about 13 percent of the article height.

20. An improved can combiner for separating a stream of randomly oriented articles moving along an air conveyor path from an upstream to a downstream position into either right or left lanes, said articles having a generally uniform article height measured along a longitudinal axis of said articles and upstanding on said path with said longitudinal axis generally perpendicular to said path, said combiner comprising:

(a) an air conveyor deckplate having opposite lateral edges open to opposing sides of said deckplate with said conveyor path therebetween, said deckplate having a plurality of air jet orifices extending through said deckplate, said jets being oriented to propel said articles on said deckplate in a generally downstream direction, the number of said jets being at a predetermined value per unit area of deckplate;

(b) a plenum in pneumatic communication with said deckplate for being connected to a source of air under pressure to supply said air to said jets;

(c) a perforated cover mounted parallel to said deckplate above said deckplate at a vertical distance slightly greater than said article height, said cover restraining said articles against tipping over about said longitudinal axis;

(d) a first pair of elongated raised border members for establishing outer right and left boundaries for said path, said stops being mounted to said deckplate and extending longitudinally along the opposite lateral edges thereof in alignment with the direction of article flow;

(e) a second pair of right and left elongated raised divider members mounted to said deckplate between said border members, said divider members meeting at a point and extending in a downstream direction from said point at an acute angle to each other along at least a portion of said divider member lengths in the region of said point, the right divider member being spaced from said right border member to form said right lane therebetween and said left divider member being spaced from said left border member to form said left lane therebetween, whereby said articles encountering said point tend to separate into either the left or the right lane, said border and divider members having a top wall portion spaced a preselected vertical distance from said deckplate that is high enough to deflect a majority of said articles to either side of said point and retain said articles within said lanes, but is low enough to permit some of aid articles to fall across said members to be thereby expelled out of said air conveyor.

21. The improved can combiner of claim 20, wherein said border and divider members comprise relatively rigid elongated strips of rectangular cross-section affixed directly to said deckplate and having a vertical height that is substantially about 13 per cent of the average height of said articles.

22. The improved can combiner of claim 21, wherein said strips are formed of polyethylene and have a height of substantially about TM inch.

23. The improved can combiner of claim 22, wherein a lower surface of said cover is spaced from said deckplate by a vertical distance of substantially about ⅛ inch above article height.

24. An air conveyor system for transporting a stream of articles en masse along a channel from a generally upstream position in a generally downstream direction towards a generally downstream position, said system comprising:

(a) a conveyor surface having opposing edges with said channel therebetween and a plurality of air propulsion slots extending through said surface, said slots being directionally oriented to propel articles pneumatically on said surface in said downstream direction;

(b) a plenum for connecting to a source of air under pressure and in communication with said slots;

(c) a pair of spaced apart guide members for defining boundaries for at least a portion of said channel, by being mounted adjacent said opposing edges of said surface in alignment with said downstream direction to generally direct flow of said articles in said downstream direction by impeding article movement across said members, said members each having a guide member height above said surface that is substantially less than a height of said articles above said surface, said member height being chosen to cause said articles to either flow in said downstream direction or be propelled over said guide member to a region outside of said channel; and (d) a pair of intersecting guide members intersecting at a point defining an apex of a V-shape, said apex being oriented towards said upstream direction to encounter said articles and deflect said articles to either side of said V, said intersecting guide member pair being mounted inwardly of said spaced apart guide member pair for dividing said channel into left and right channels to separate said article flow into said left and right channels as said articles encounter said apex, said intersecting guide member pair enclosing a region towards an open side of said V facing in a generally downstream direction for receiving articles that are propelled across said intersecting guide member pair, whereby any articles that do not pass into either said left or right channel are propelled across said guide members and out of said channels.

25. The air conveyor system of claim 24, further comprising a conveyor surface between said intersecting guide member pair having a plurality of air propulsion slots in communication with said plenum and directionally oriented for further propelling articles between said V towards the open end of said V.

26. The air conveyor of claim 25, wherein said conveyor surface between said intersecting guide member pair has a slot density less than other said conveyor surface within said channels.

* * * * *